United States Patent
Laksono

(10) Patent No.: US 7,533,271 B2
(45) Date of Patent: May 12, 2009

(54) METHOD AND APPARATUS FOR REMOTE CONTROL AND MONITORING OF A MULTIMEDIA SYSTEM

(75) Inventor: Indra Laksono, Richmond Hill (CA)

(73) Assignee: ViXS Systems, Inc., Toronto, Ontario (CA)

( * ) Notice: Subject to any disclaimer, the term of this patent is extended or adjusted under 35 U.S.C. 154(b) by 1533 days.

(21) Appl. No.: 09/946,227

(22) Filed: Sep. 5, 2001

(65) Prior Publication Data

US 2003/0046584 A1    Mar. 6, 2003

(51) Int. Cl.
  H04K 1/00   (2006.01)
  H04L 9/00   (2006.01)
  H04N 7/167  (2006.01)
  G06F 17/30  (2006.01)
  H04N 7/16   (2006.01)
  G06F 13/00  (2006.01)
  H04N 7/18   (2006.01)
  H04N 7/173  (2006.01)

(52) U.S. Cl. .................. 713/184; 713/150; 713/165; 380/211; 380/212; 380/241; 380/242; 726/2; 726/27; 705/51; 725/9; 725/48; 725/82; 725/114; 725/117

(58) Field of Classification Search .......... 713/184; 380/211, 212, 241, 242; 725/9, 48, 82, 114, 725/117

See application file for complete search history.

(56) References Cited

U.S. PATENT DOCUMENTS

| | | | | |
|---|---|---|---|---|
| 5,920,642 A | * | 7/1999 | Merjanian | 382/126 |
| 5,973,756 A | * | 10/1999 | Erlin | 348/734 |
| 6,075,575 A | * | 6/2000 | Schein et al. | 348/734 |
| 6,678,721 B1 | * | 1/2004 | Bell | 709/209 |
| 6,701,523 B1 | * | 3/2004 | Hancock et al. | 725/25 |
| 6,763,392 B1 | * | 7/2004 | del Val et al. | 709/231 |
| 6,765,920 B1 | * | 7/2004 | Tari et al. | 370/401 |
| 6,785,716 B1 | * | 8/2004 | Nobakht | 709/219 |
| 6,804,357 B1 | * | 10/2004 | Ikonen et al. | 380/241 |
| 6,829,368 B2 | * | 12/2004 | Meyer et al. | 382/100 |
| 6,882,299 B1 | * | 4/2005 | Allport | 341/176 |
| 7,069,345 B2 | * | 6/2006 | Shteyn | 709/250 |
| 2003/0189913 A1 | * | 10/2003 | Kim | 370/338 |
| 2004/0078825 A1 | * | 4/2004 | Murphy | 725/109 |
| 2005/0021785 A1 | * | 1/2005 | Nakaji | 709/229 |
| 2005/0286555 A1 | * | 12/2005 | Hayashi | 370/466 |
| 2006/0068759 A1 | * | 3/2006 | Ikebe et al. | 455/411 |
| 2006/0265459 A1 | * | 11/2006 | Petry et al. | 709/206 |
| 2007/0288550 A1 | * | 12/2007 | Ise et al. | 709/203 |
| 2008/0144610 A1 | * | 6/2008 | Kakiuchi | 370/352 |

* cited by examiner

*Primary Examiner*—Ayaz Sheikh
*Assistant Examiner*—Aravind K Moorthy
(74) *Attorney, Agent, or Firm*—Garlick Harrison & Markison; Timothy W. Markison; Kevin L. Smith

(57) ABSTRACT

A method and apparatus for remote control and/or monitoring of a multimedia system includes processing that begins when a hand held device transmits a remote control/monitoring request to a server. The processing continues once a communication path is established between the hand held device and the server by having the server determine remote control and monitoring privileges of the hand held device. If the hand held device has at least a minimum level of remote control and monitoring privileges, the processing continues as the server processes the remote control/monitoring request with respect to at least one client to produce operational monitoring data. The processing continues as the server provides the operational monitoring data to the hand held device via the communication path.

31 Claims, 7 Drawing Sheets

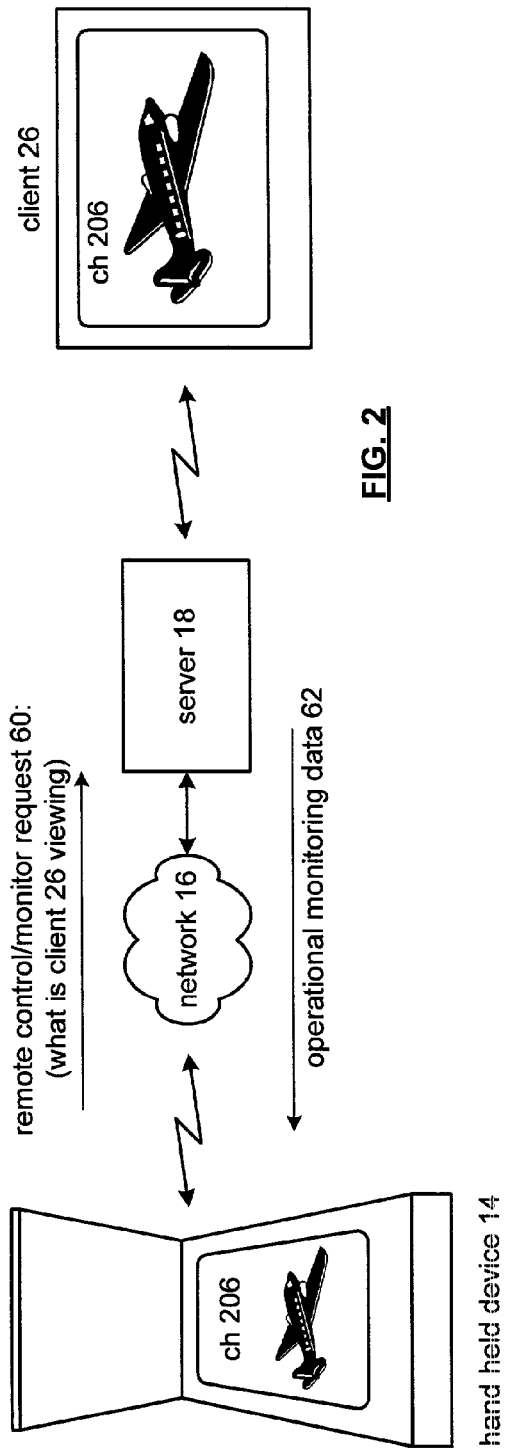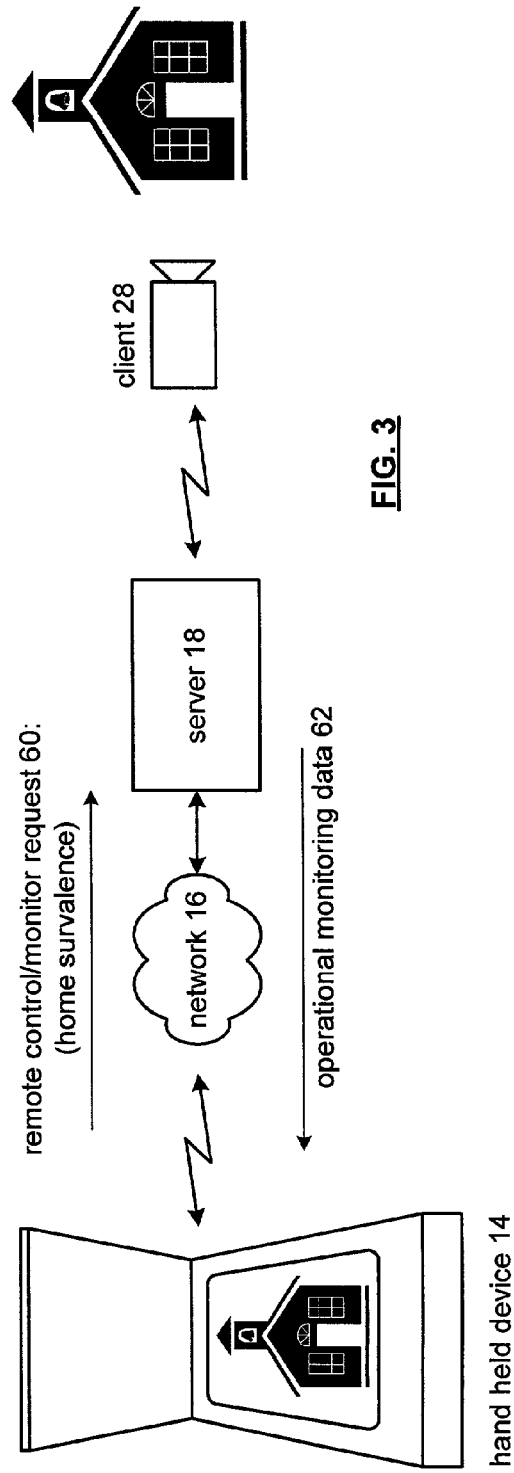

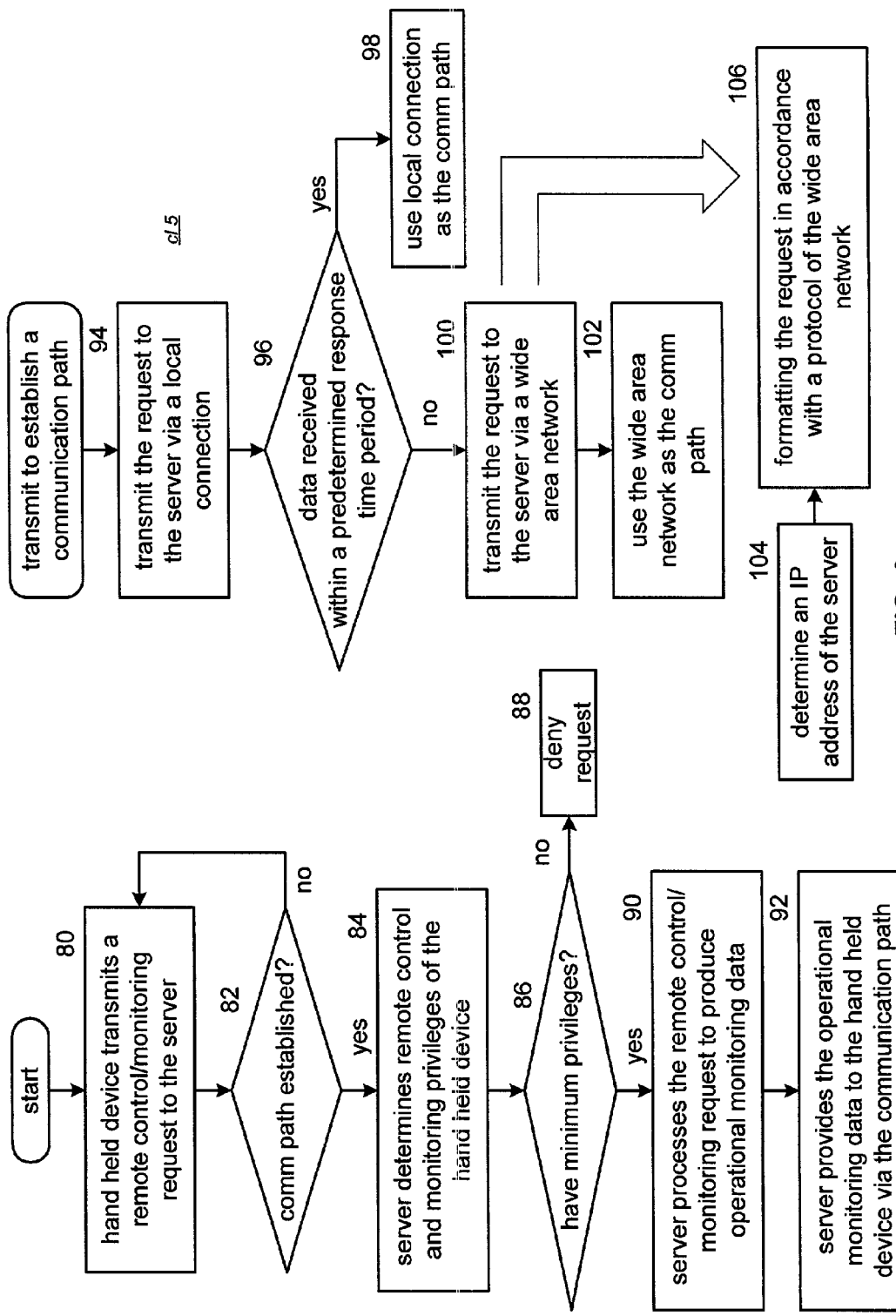

US 7,533,271 B2

METHOD AND APPARATUS FOR REMOTE CONTROL AND MONITORING OF A MULTIMEDIA SYSTEM

TECHNICAL FIELD OF THE INVENTION

This invention relates generally to communication systems and more particularly to remote control and/or monitoring of an in-home local area networking.

BACKGROUND OF THE INVENTION

Communication systems are known to convey data from one entity to another. The data may be audio data, video data and/or text data. In such communication systems, the data is transmitted via one or more transmission mediums (e.g., radio frequencies, coaxial cable, twisted pair copper wire, fiber optic cabling, et cetera) in accordance with one or more data transmission protocols. The distance over which the data traverses within a communication system may be inches, feet, miles, tens of miles, hundreds of miles, thousands of miles, et cetera.

As is also known, communication systems have two basic configurations: wide area networks (WAN) and local area networks (LAN). In addition, WAN and/or LAN communication systems may use a variety of transmission types including broadcast transmissions, asymmetrical transmissions, and symmetrical transmissions. In a broadcast communication system, a network hub transmits data to a plurality of users with little or no data being transmitted from the users to the network hub. Examples of broadcast communication systems include radio systems, NTSC (national television standards committee) television systems (e.g., regular TV), high definition television systems, cable systems, and satellite systems. In each of these broadcast communication systems, a network hub (e.g., radio station, television station, et cetera) transmits a broadcast signal. Any user within range of the broadcast signal and who has an appropriate receiver (e.g., radio, television, et cetera) can receive the broadcast signal. Such broadcast systems employ a particular data transmission protocol such as amplitude modulation, frequency modulation, ultra-high frequency, very high frequency, et cetera.

Asymmetrical communication systems transmit more data in one direction than in another (i.e., one entity transmits to others more than it receives data from each of the other entities). An example of an asymmetrical communication system is the Internet, where web servers transmit substantially more data than they receive from any one user. The Internet uses TCP/IP as its data transmission protocol, while a variety of physical layer data transmission protocols may be used to access the Internet. Such physical layer data transmission protocols include asynchronous transfer mode (ATM), frame relay, integrated services digital network (ISDN), digital subscriber loop (DSL) and all derivatives thereof, and multiple packet label switching (MPLS). Such asymmetrical communication systems may be wide area networks (e.g., the Internet), or local area networks (e.g., local server based system).

Symmetrical communication systems include a plurality of users where the data flow between any of the users could be equal. Examples of symmetrical communication systems include public switch telephone network (PSTN), local computer networks, cellular telephone systems, intercom systems, private branch exchanges (PBX), et cetera. Such symmetrical communication systems use at least one data transmission protocol. For example, a computer network may utilize any one of the Ethernet standards.

In any type of communication system, a user must have the appropriate receiving and possibly transmitting equipment to independently access the communication system. For example, a user of a satellite television system must have a satellite receiver and a television to receive satellite broadcast. If another television is to independently access the satellite broadcast, it needs its own satellite receiver. The same is true for NTSC broadcast, cable broadcast, et cetera, although currently most televisions include an NTSC tuner and/or some form of cable tuner.

With the number of households having multiple television sets increasing, and many users wanting the latest and greatest video viewing services. As such, many households have multiple satellite receivers, cable set-top boxes, modems, et cetera. As is further known, dependent multiple access to satellite broadcasts may be achieved by linking slave televisions to a master television. The master television has full control of, and independent access to, the satellite receiver while the slave televisions receive whatever channel has been selected by the master.

Each of the televisions, satellite receivers and/or any other type of home entertainment device may be controlled via a remote control device to change the channel, increase/decrease volume, etc. Such a remote control device may be programmed to provide remote control of multiple televisions, satellite receivers, and/or any other type of home entertainment device. As is known, a remote control device communicates with a television, satellite receiver, and/or any other type of home entertainment device via a radio frequency or infrared communication path.

While a remote control device may be programmed to control multiple entertainment devices, it does so merely as an extension of input controls of the device. Such as remote control device does not function as a supervisor of a local area network or of an individual device within the network. Such a supervisory role would include, but is not limited to, pre-emptive control of a device in the network, monitoring a device in the network, disabling all or part of the network, and setting accessing restrictions on a device-by-device basis locally or from a remote location.

Therefore, a need exists for a method and apparatus that provides remote control and/or monitoring of a multimedia system locally or from a remote location.

BRIEF DESCRIPTION OF THE DRAWINGS

FIG. 2 illustrates a graphical representation of remote monitoring of a device of a multimedia system in accordance with the present invention;

FIG. 3 illustrates a graphical representation of remote surveillance via a multimedia system in accordance with the present invention;

FIGS. 5-8 illustrate a logic diagram of a method for remote control and monitoring of a multimedia system in accordance with the present invention;

DETAILED DESCRIPTION OF A PREFERRED EMBODIMENT

Generally, the present invention provides a method and apparatus for remote control and/or monitoring of a multimedia system. Such a method and apparatus includes processing that begins when a hand held device of the multimedia system transmits a remote control/monitoring request to a server of the multimedia system. The processing continues once a communication path is established between the hand held device and the server by having the server determine remote control and monitoring privileges of the hand held device. If the hand held device has at least a minimum level of remote control and monitoring privileges, the processing continues as the server processes the remote control/monitoring request with respect to the at least one of the plurality of clients to produce operational monitoring data. The processing continues as the server provides the operational monitoring data to the hand held device via the communication path. With such a method and apparatus, a hand held device may obtain a supervisory role of a multimedia system by having remote control and/or monitoring access over each client within the multimedia system.

Figure 1:
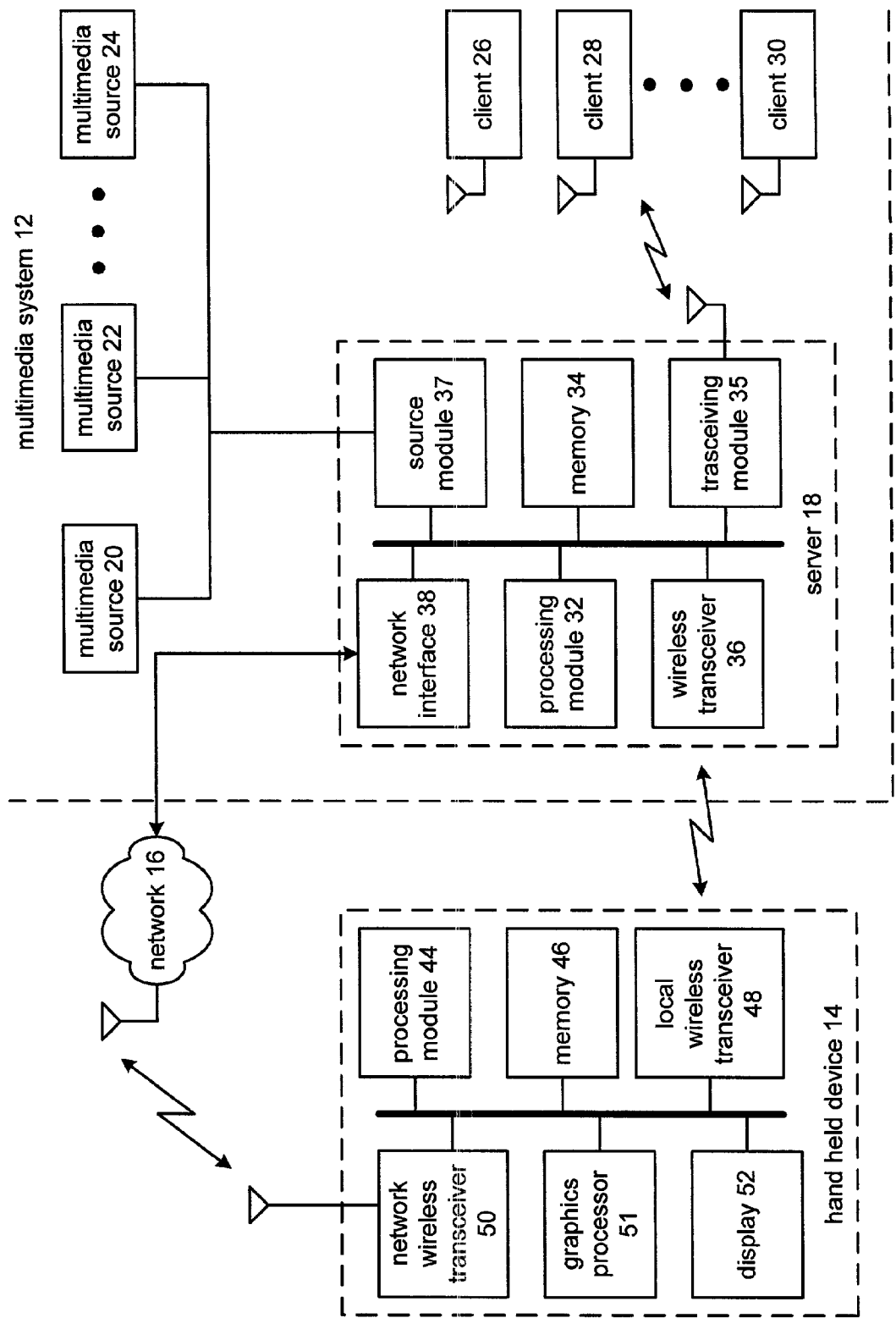
FIG. 1 illustrates a schematic block diagram of a multimedia system in accordance with the present invention.

The present invention may be further described with reference to FIGS. 1-11. FIG. 1 illustrates a schematic block diagram of a system 10 that includes a multimedia system 12 and a hand held device 14, which may be operably coupled together via a network 16. The multimedia system 12 includes a server 18, a plurality of multimedia sources 20-24, and a plurality of clients 26-30. The server 18 includes a processing module 32, memory 34, transceiving module 35, wireless transceiver 36, source module 37, and a network interface 38. The hand held device 14 includes a processing module 44, memory 46, local wireless transceiver 48, network wireless transceiver 50, graphics processor 51, and a display 52. The network 16 may be a wide area network and/or a local area network that utilizes broadcast transmissions, asymmetrical transmissions, and/or symmetrical transmissions.

The processing module 32 and processing module 44 may be a single processing device or a plurality of processing devices. Such a processing device may be a microcontroller, microprocessor, microcomputer, central processing unit, digital signal processor, programmable gate array, state machine, logic circuitry, and/or any device that manipulates signals (analog and/or digital) based on operational instructions. The memory 34 and memory 46 may be a single memory device or a plurality of memory devices. Such a memory device may be a read-only memory, random access memory, system memory, flash memory, magnetic tape memory, programmable memory, erasable memory, and/or any device that stores digital information. Note that when the processing module 32 or 44 implements one or more of its functions via a state machine or logic circuitry, the memory storing the corresponding instructions is embedded within the circuitry comprising the state machine or logic circuitry. The functions performed by processing module 32 or 44 and stored in memory 34 or 46 are generally described in the logic diagrams of FIGS. 5-11, which will be discussed below.

The server 18 is operably coupled to receive a plurality of channels 36 from one or more of the multimedia sources 20-24. The multimedia sources 20-24 may be a satellite connection, cable connection, antenna connection for NTSC television broadcast, HDTV broadcast, PAL broadcast, VCR player/recorder, DVD player, et cetera. As one of average skill in the art will appreciate, the server 18 may be a stand-alone device, may be incorporated in a satellite receiver, set-top box, cable box, HDTV tuner, home entertainment receiver, et cetera. In addition, the server 18 may be implemented using discrete components, integrated circuits, and/or a combination thereof.

The server 18 communicates with the plurality of client 26-30 via a communication path, which may be a radio frequency communication path, a wire line connection, an infrared connection, and/or any other means for conveying data. As such, the server 18 and each of the clients 26-30 include a receiver and/or transmitter operable to convey data via the given type of communication path. A client 26-30 may be a personal digital assistant, a personal computer, a monitor (e.g., LCD monitor, flat panel monitor, CRT monitor, et cetera and may include speakers, or speaker connections, et cetera), a television set, high definition television (HDTV), standard definition television (SDTV), a home theatre system, laptop computer, et cetera. The operation of the multimedia system 12 is further described in co-pending patent application entitled METHOD AND APPARATUS FOR A MULTIMEDIA SYSTEM, having a Ser. No. of 09/864,524, and a filing date of May 24, 2001.

The hand held device 14 may be a personal digital assistant, cellular telephone, laptop computer, and/or any other device that includes a processing module 44, memory 46, local wireless transceiver 48, network wireless transceiver 50, graphics processor 51, and a display 52. In operation, the hand held device 14 provides a remote control/monitor request to the server via the local wireless transceiver or via the network wireless transceiver. The local wireless transceiver may utilize an infrared transmission scheme, such as IrDA, a radio frequency transmission scheme, such as 802.11 (a), (b), or any known type of short distance wireless transmission schemes. If the hand held device 14 is not within range to use the local wireless connection, the hand held device 14 will utilize the network wireless transceiver 50 to transmit the remote control/monitor request to the server via the network 16.

The remote control/monitoring request may be: a request for identifying a video program being viewed by the one of the clients; request to disable all or part of the multimedia system; request to disable at least one of the clients; request to set viewing restrictions for one or more of the clients; request to send a message to at least one of the clients, such as a video message, an audio message and/or a text message; request to view of images being captured by at least one of the clients; and request to restrict at least one of the clients access to a particular channel or any program having a rating above a certain level.

To provide the remote control/monitoring request to the server via the network, the network wireless transceiver 50, which may be a wireless Ethernet card, wireless email card, etc., sends an email message that includes the remote control/monitoring request to the server 18. Upon the receiving the request, the server 18 verifies the hand held device and, when verified, processes the request. The particular type of processing is dependent on the type of request, which will be described in greater detail below with reference to FIGS. 2-11.

FIG. 2 illustrates a graphical representation of the server 18 processing a remote control/monitoring request 60 from a hand held device 14. The hand held device 14 generates this particular remote control/monitoring request 60 to monitor what client 26 is watching and provides to the network 16. Since the request 60 is formatted in accordance with an Internet email transmission, or any other type of Internet transmission, the network 16 forwards the request to the server 18. Utilizing the network interface 38, which may be an Ethernet card and/or any other type of network card, extracts the request 60 from the network message. The server 18 interprets the request 60 to identify the hand held device 14 to authenticate it. Once authenticated, the server 18 determines what client 26 is viewing and generates operational monitoring data 52, which indicates what client 26 is viewing.

The operational monitoring data 52 may be the video and/or audio data of the channel (e.g., channel 206) being viewed by client 26; still frames of the video being viewed by client 26; text indicating the channel; and/or channel description of the program on the channel being viewed. The server packetizes the operational monitoring data 52 and provides the packets to the hand held device 14 via the network 16. The hand held device 14 retrieves the operational monitoring data 52 and processes it to produce a display. As such, the hand held device is able to monitor what client 26 is viewing on its display.

FIG. 3 illustrates a graphical representation of the hand held device 14 receiving video images captured by the server 18 via a home surveillance camera (i.e., client 28). In this example, the hand held device 14 provides a home surveillance request as the remote control/monitoring request 60 to the server 18. After authenticating the request (i.e., the hand held device is authorized to have a surveillance request fulfilled), the server generates operational monitoring data 62, which includes video images captured by the client 28. Upon receiving the data 62, the hand held device 14 produces a corresponding display.

Figure 4:
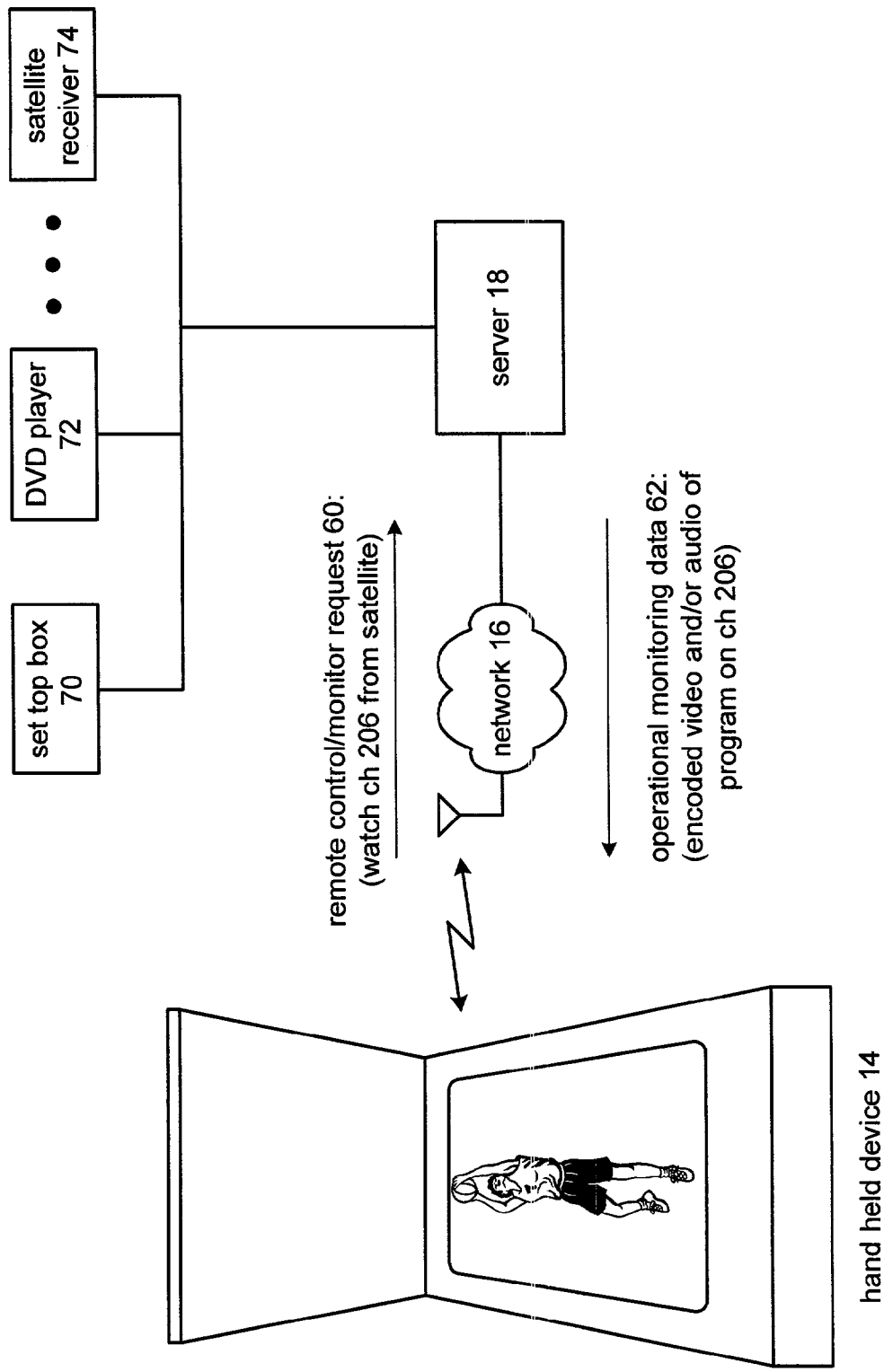
FIG. 4 illustrates a graphical representation of remote access of a multimedia source via a multimedia system in accordance with the present invention.

FIG. 4 illustrates a graphical representation of the hand held device 14 requesting and subsequently receiving access to one of the multimedia sources, which may be a set top box 70, DVD player 72, and/or a satellite receiver 74. Accordingly, the hand held device 14 provides a remote control/monitoring request 60 to the server, wherein the request is requesting to watch channel 206 being received from the satellite receiver. There are a variety of ways in which the request 60 could be formatted to convey the desired information. For instance, as in accordance with a TCP/IP transmission, data packets include a header section and a payload section. The header section includes destination addressing information and the source address. The payload section may be used to carry the particular request.

The server 18 encodes the video images and/or audio of the requested channel and provides them in packets to the hand held device 14. The processing module 44, within the hand held device 14, decodes the packets to recapture the video images. Depending the available bandwidth between the server and the hand held device, the amount of video image data will vary from a few frames every second or several seconds to 30 frames per second. The encoding and corresponding decoding may be done using one of the MPEG standards.

FIGS. 5-8 illustrate a logic diagram of method for remote control and monitoring of a multimedia system. The process begins at step 80, where a hand held device of the multimedia system transmits a remote control/monitoring request to a server of the multimedia system. The remote control/monitoring request may be: requesting identification of a video program being viewed by at one of the plurality of clients; disabling the multimedia system; disabling at least one of the plurality of clients; setting viewing restrictions for at least one of the plurality of clients; sending a message to at least one of the plurality of clients, wherein the message includes a video message, an audio message and/or a text message; requesting viewing of images being captured by the at least one of the plurality of clients; and/or disabling the at least one of the plurality of clients access to at least one particular channel.

The processing continues at step 82, where a determination is made as to whether a communication path has been established between the hand held device and the server. If not, the process reverts to step 80, where a retry mechanism is used to establish the communication path. If a communication path cannot be established before the retry mechanism is exhausted, the request is denied. The establishment of the communication path will be described in greater detail with reference to FIG. 6.

When the communication path is established between the hand held device and the server, the process proceeds to step 84 where the server determines remote control and monitoring privileges of the hand held device. The determination of the privileges will be described in greater detail with reference to FIG. 8. The process continues at step 86 where the server determines whether the hand held device has at least a minimum level of remote control and monitoring privileges. If not, the process proceeds to step 88 where the request is denied.

If the hand held device has a minimal level of privileges, the process proceeds to step 90, where the server processes the remote control/monitoring request with respect to at least one of the plurality of clients to produce operational monitoring data. The processing of the request is dependent upon the request and includes: providing identification of the video program being viewed by at least one of the plurality of clients; providing feedback that the multimedia system has been disabled; providing feedback that at least one of the plurality of clients has been disabled; providing feedback that viewing restrictions for at least one of the plurality of clients have been set; providing a response from at least one of the plurality of clients to the message, wherein the response includes at least one of: a video response, an audio response and a text response; providing the images being captured by at least one of the plurality of clients; and/or providing an indication that the at least one of the plurality of clients access to the at least one particular channel has been disabled. The process then proceeds to step 92 where the server provides the operational monitoring data to the hand held device via the communication path.

FIG. 6 illustrates a logic diagram that further describes the process for establishing a communication path. The processing begins at step 94 where the hand held device transmits the remote control/monitoring request to the server via a local connection. The local connection may be an infrared connection or a radio frequency connection. The process then proceeds to step 96 where the hand held device determines whether the response is received via the local connection within a predetermined response time period. If yes, the process proceeds to step 98, the hand held device and the server utilize the local communication path to convey requests and operational monitoring data.

If a response is not received within the predetermined period of time, the process proceeds to step 100 where the hand held device transmits the remote control/monitoring request to the server via a wide area network. This may done as further illustrated at steps 104 and 106. At step 104, the hand held device determines an Internet protocol (IP) address of the server. Having determined the IP address, the process proceeds to step 106, where the hand held device formats the remote control/monitoring request in accordance with a protocol of the wide area network (e.g., TCP/IP) to produce a formatted request, wherein the formatted request includes the IP address of the server as a destination address and an IP address of the hand held device as a source address. The process then proceeds to step 102, where the hand held device transmits the request via the wide area network.

Figure 7:
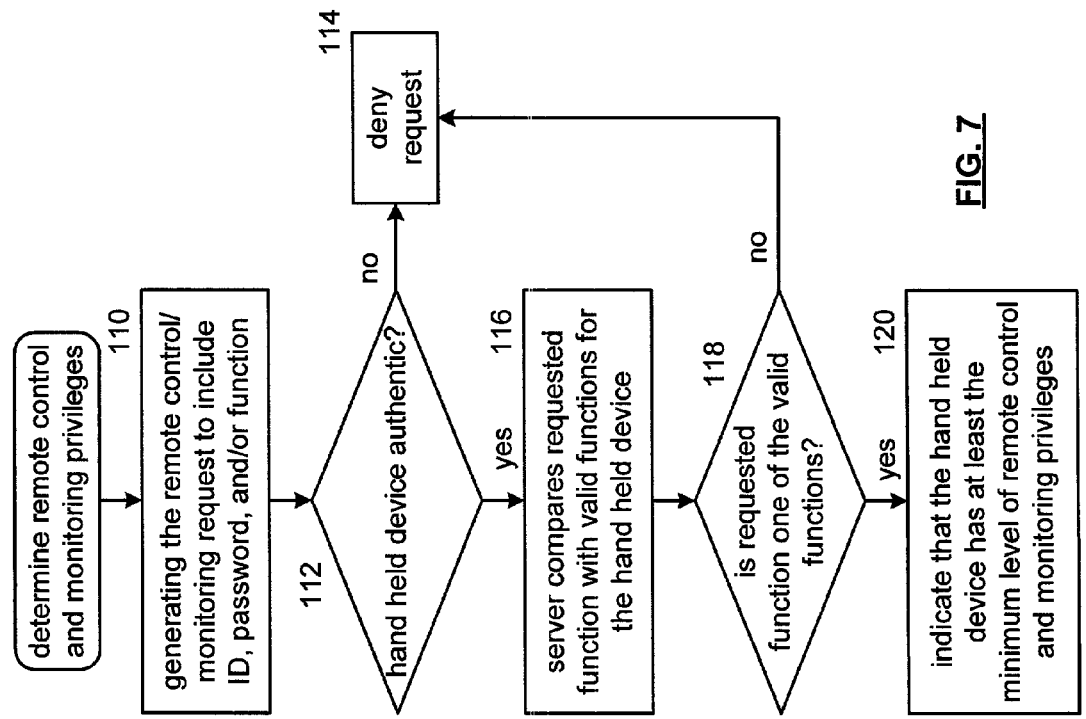

FIG. 7 illustrates a logic diagram that further describes the determination of the remote control and monitoring privileges. The process begins at step 110 where the hand held device generates the remote control/monitoring request to include an identity of the hand held device, a password associated with the hand held device, specific remote control function, specific monitoring function, and/or identity of the at least one of the plurality of clients. The process then proceeds to step 112, where the server determines whether the hand held device is authentic based on the identity of the hand held device and/or its password. If the hand held device is not authenticated, the process proceeds to step 114 where the request is denied.

If the hand held device is authenticated, the process proceeds to step 116, where the server compares the requested function with valid functions of the hand held device. The process then proceeds to step 118 where a determination is made as to whether the requested function is one of the valid functions. If not, the process reverts to step 114 where the request is denied. If the request is valid, the process proceeds to step 120 where the server indicates that the hand held device has at least the minimum level of remote control and monitoring privileges.

Figure 8:
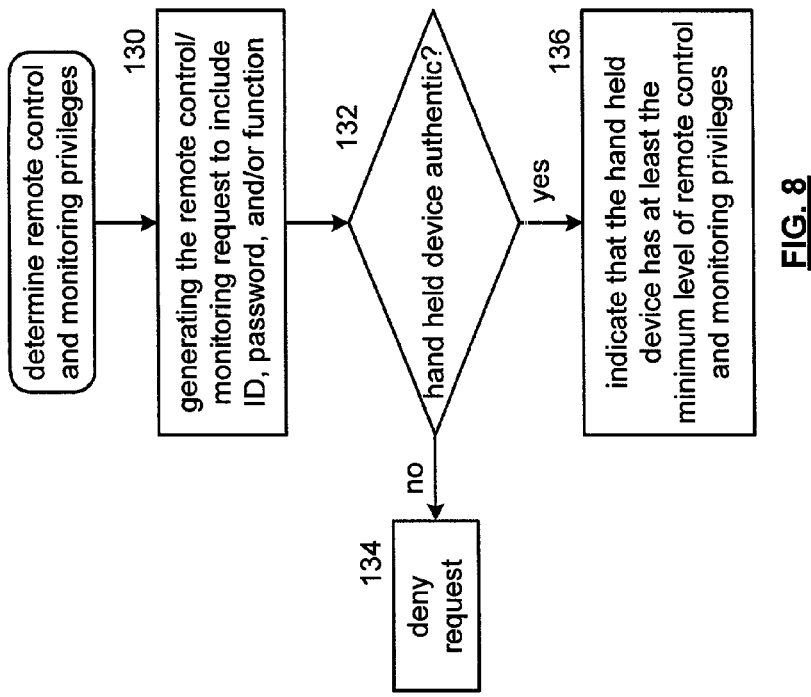

FIG. 8 illustrates a logic diagram that further describes an alternate method for determining the remote control and monitoring privileges of the hand held device. The process begins at step 130 where the hand held device generates the remote control/monitoring request to include an identity of the hand held device, a password associated with the hand held device, specific remote control function, specific monitoring function, and/or identity of the at least one of the plurality of clients. The process then proceeds to step 132, where the server determines whether the hand held device is authentic based on the identity of the hand held device and/or its password. If the hand held device is not authenticated, the process proceeds to step 134 where the request is denied. If the hand held device is authenticated, the process proceeds to step 136, where the server indicates that the hand held device has at least the minimum level of remote control and monitoring privileges.

Figure 9:
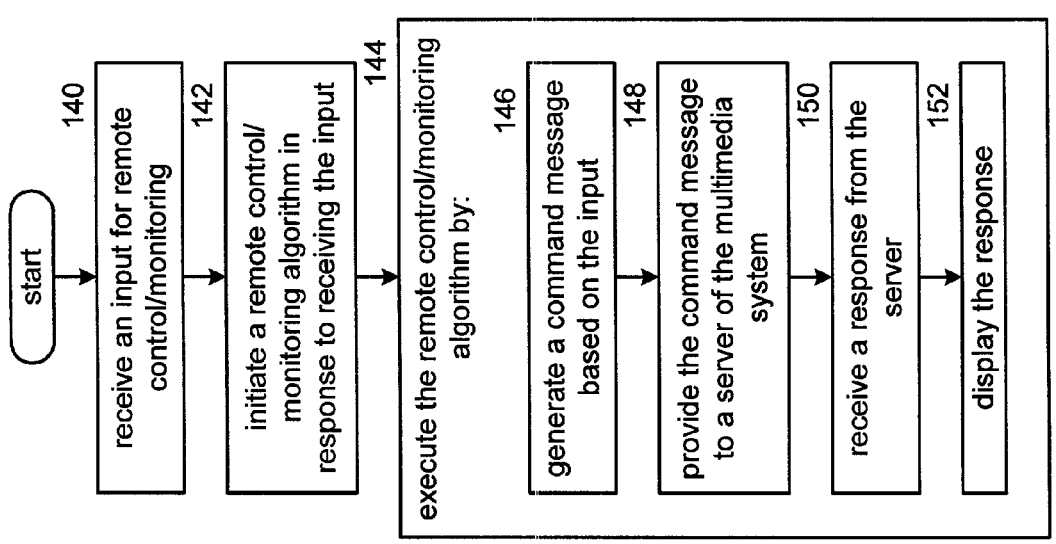
FIG. 9 illustrates a logic diagram of a method for a hand held device for remote control and monitoring of a multimedia system in accordance with the present invention.

FIG. 9 illustrates a logic diagram of a method for a hand held device to process remote control and monitor of a multimedia system. The process begins at step 140 where the hand held device receives an input for remote control/monitoring of the multimedia system. The process then proceeds to step 142 where the hand held device initiates a remote control/monitoring algorithm in response to receiving the input. The process then proceeds to step 144 where the hand held device executes the remote control/monitoring algorithm as shown at steps 146-152.

At step 146, the hand held device generates a command message based on the input. The command message includes: requesting identification of a video program being viewed by at one of the plurality of clients; disabling the multimedia system; disabling at least one of the plurality of clients; setting viewing restrictions for at least one of the plurality of clients; sending a message to at least one of the plurality of clients, wherein the message includes at least one of: a video message, an audio message and a text message; requesting viewing of images being captured by the at least one of the plurality of clients; and/or disabling at least one of the plurality of clients access to at least one particular channel.

At step 148, the hand held device provides the command message to a server of the multimedia system. The hand held device may do this by transmitting the command message to the server via a local connection. Then, the hand held device determines whether the response is received within a predetermined response time period. The hand held device then transmits the command message to the server via a wide area network when the response is not received within the predetermined response time period via the local connection. The security of the transmission of the command message is enhanced by encrypting the command message.

The process then proceeds to step 150 where the hand held device receives a response from the server. The process then proceeds to step 152 where the hand held device displays the response as graphically illustrated in FIGS. 2-4.

Figure 10:
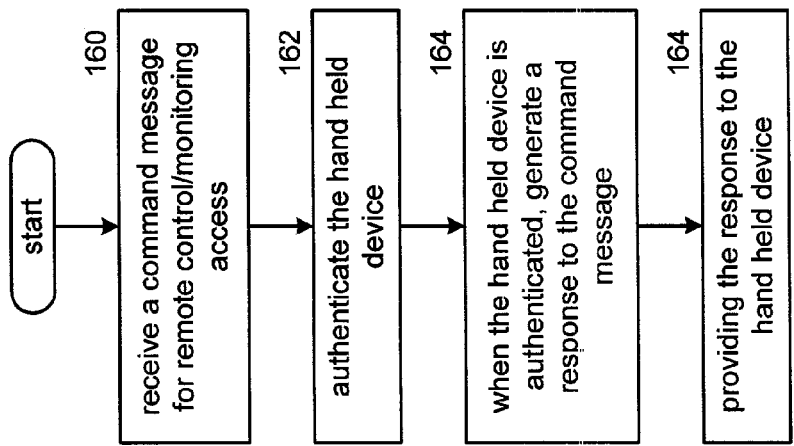
FIG. 10 illustrates a logic diagram of a method for a server to process remote control and monitoring of a multimedia system in accordance with the present invention.

FIG. 10 illustrates a logic diagram of method for a server to process remote control and monitoring for a multimedia system. The process begins at step 160 where the server receives a command message for remote control/monitoring access to the multimedia system from a hand held device. The process then proceeds to step 162 where the server authenticates the hand held device. The process then proceeds to step 164 where the server generates a response to the command message, when the hand held device is authenticated. The process then proceeds to step 166 where the server provides the response to the hand held device.

Figure 11:
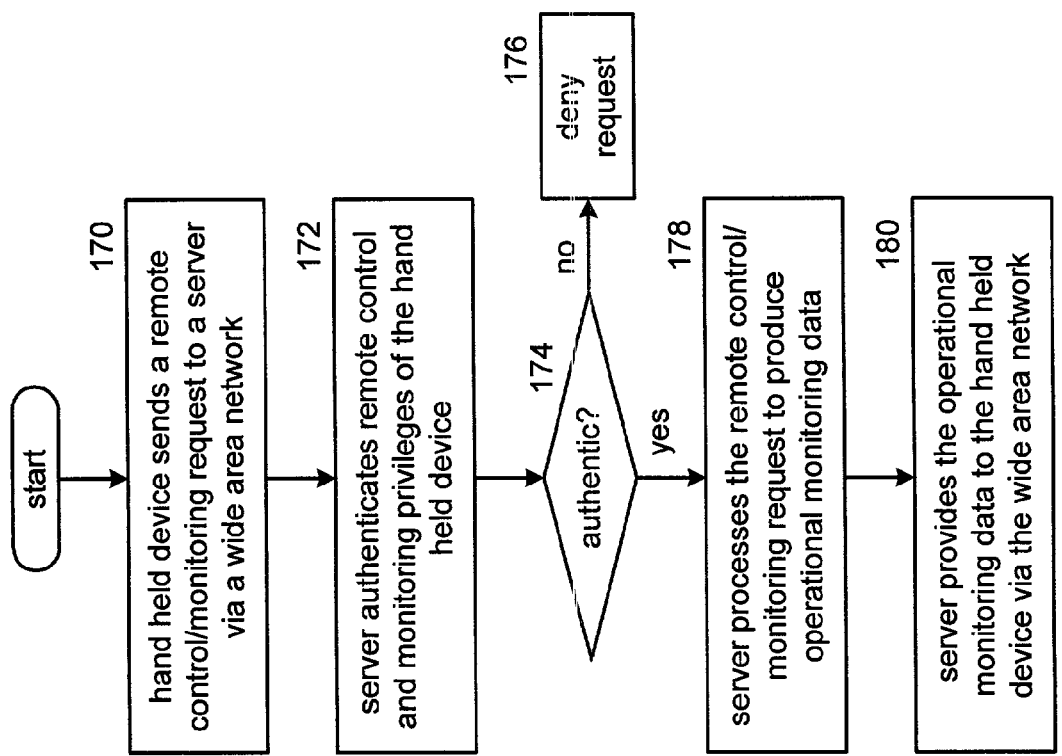
FIG. 11 illustrates a logic diagram of an alternate method for remote control and monitoring of a multimedia system in accordance with the present invention.

FIG. 11 illustrates a logic diagram of a method for a server to process remote control and monitoring for a multimedia system. The process begins at step 170 where the server receives a command message for remote control/monitoring access to the multimedia system from a hand held device. The process then proceeds to step 172 where the server authenticates the hand held device. If, at step 174, the server is not authentic, the process proceeds to step 176, where the server denies the request. If the hand held device is authenticated, the process proceeds to step 178 where the server generates a response to the command message. The process then proceeds to step 180 where the server provides the response to the hand held device.

The preceding discussion has presented a method and apparatus for remote control and/or monitoring of a multimedia system. In accordance with the present invention, a hand held device may be used as a remote control device for the multimedia system and/or a monitor of the multimedia system. As one of average skill in the art will appreciate, other embodiments may be derived from the teachings of the present invention without deviating from the scope of the claims.

What is claimed is:

1. A method for remote control and monitoring of a multimedia system, the method comprises:
  transmitting, by a hand held device of the multimedia system, a remote control/monitoring request regarding at least one of a plurality of clients of the multimedia system to a server of the multimedia system;
  when a communication path is established between the hand held device and the server, determining, by the server, remote control and monitoring privileges of the hand held device;
  when the server determines that the hand held device has at least a minimum level of remote control and monitoring privileges, processing, by the server, the remote control/ monitoring request with respect to the at least one of the plurality of clients to produce operational monitoring data; and providing, by the server, the operational monitoring data to the hand held device via the communication path;

establishing a communication path between the hand held device and the server by:

transmitting, by the hand held device, the remote control/monitoring request to the server via a local connection; and when the server receives the remote control/monitoring request via the local connection, establishing the communication via the local connection;

determining, by the hand held device, whether operational monitoring data is received within a predetermined response time period;

when the operational monitoring data is not received within the predetermined response time period, transmitting, by the hand held device, the remote control/monitoring request to the server via a wide area network by:

determining an internet protocol (IP) address of the server; and formatting the remote control/monitoring request in accordance with a protocol of the wide area network to produce a formatted request, wherein the formatted request includes the IP address of the server as a destination address and an IP address of the hand held device as a source address; and when the server receives the remote control/monitoring request via the wide area network, establishing the communication path via the wide area network.

2. The method of claim 1, wherein the local connection comprises at least one of: an infrared connection and a radio frequency connection.

3. The method of claim 1, wherein the determining remote control and monitoring privileges further comprises:

generating the remote control/monitoring request to include at least one of: an identity of the hand held device, a password associated with the hand held device, specific remote control function, specific monitoring function, and identity of the at least one of the plurality of clients;

authenticating, by the server, the hand held device based on at least one of the identity of the hand held device and the password;

when the hand held device is authenticated, comparing, by the server, at least one of the specific remote control function and the specific monitoring function with valid remote control and monitoring functions for the hand held device; and when the at least one of the specific remote control function and the specific monitoring function is one of the valid remote control and monitoring functions, indicating that the hand held device has at least the minimum level of remote control and monitoring privileges.

4. The method of claim 1, wherein the determining remote control and monitoring privileges further comprises:

generating the remote control/monitoring request to include at least one of: an identity of the hand held device, a password associated with the hand held device, specific remote control function, specific monitoring function, and identity of the at least one of the plurality of clients;

authenticating, by the server, the hand held device based on at least one of the identity of the hand held device and the password; and when the hand held device is authenticated, indicating that the hand held device has at least the minimum level of remote control and monitoring privileges.

5. The method of claim 4 further comprises:

encrypting, by the hand held device, the remote control/monitoring request to produce an encrypted request;

transmitting the encrypted request as the remote control/monitoring request; and decrypting, by the server, the encrypted request to recapture the remote control/monitoring request.

6. The method of claim 1, wherein the remote control/monitoring request comprises at least one of:

requesting identification of a video program being viewed by the at one of the plurality of clients;

disabling the multimedia system;

disabling the at least one of the plurality of clients;

setting viewing restrictions for the at least one of the plurality of clients;

sending a message to the at least one of the plurality of clients, wherein the message includes at least one of: a video message, an audio message and a text message;

requesting viewing of images being captured by the at least one of the plurality of clients; and disabling the at least one of the plurality of clients access to at least one particular channel.

7. The method of claim 6, wherein the providing the operational monitoring data further comprises at least one of:

providing identification of the video program being viewed by the at least one of the plurality of clients;

providing feedback that the multimedia system has been disabled;

providing feedback that the at least one of the plurality of clients has been disabled;

providing feedback that viewing restrictions for the at least one of the plurality of clients have been set;

providing a response from the at least one of the plurality of clients to the message, wherein the response includes at least one of: a video response, an audio response and a text response;

providing the images being captured by the at least one of the plurality of clients; and providing an indication that the at least one of the plurality of clients access to the at least one particular channel has been disabled.

8. A method for a hand held device to remote control and monitor at least one of a plurality of clients of a multimedia system, the method comprises:

receiving an input for remote control/monitoring of the at least one of the plurality of clients of the multimedia system;

initiating a remote control/monitoring algorithm in response to receiving the input;

executing the remote control/monitoring algorithm by:

generating a command message based on the input;

providing the command message to a server of the multimedia system includes:

transmitting the command message to the server via a local connection;

determining whether the response is received within a predetermined response time period; and when the response is not received within the predetermined response time period, transmitting the command message to the server via a wide area network includes:

determining an internet protocol (IP) address of the server; and formatting the command message in accordance with a protocol of the wide area network to produce a formatted message, wherein the formatted message includes the IP address of the server as a destination address and an IP address of the hand held device as a source address;
receiving a response from the server; and
displaying the response.

9. The method of claim 8, wherein the providing the command message further comprises:
encrypting the command message to produce an encrypted message; and
transmitting the encrypted message to the server.

10. The method of claim 8, wherein the command message comprises at least one of:
requesting identification of a video program being viewed by the at one of the plurality of clients;
disabling the multimedia system;
disabling the at least one of the plurality of clients;
setting viewing restrictions for the at least one of the plurality of clients;
sending a message to the at least one of the plurality of clients, wherein the message includes at least one of: a video message, an audio message and a text message;
requesting viewing of images being captured by the at least one of the plurality of clients; and
disabling the at least one of the plurality of clients access to at least one particular channel.

11. A method for remote control and monitoring of a multimedia system, the method comprises:
sending, by a hand held device of the multimedia system, a remote control/monitoring request regarding at least one of a plurality of clients of the multimedia system to server of the multimedia system via a wide area network by:
determining an internet protocol (IP) address of the server; and
formatting the remote control/monitoring request in accordance with a protocol of the wide area network to produce a formatted request, wherein the formatted request includes the IP address of the server as a destination address and an IP address of the hand held device as a source address;
authenticating, by the server, remote control and monitoring privileges of the hand held device;
when the server determines that the hand held device has at least a minimum level of remote control and monitoring privileges, processing, by the server, the remote control/monitoring request with respect to the at least one of the plurality of clients to produce operational monitoring data; and
providing, by the server, the operational monitoring data to the hand held device via the wide area network.

12. The method of claim 11, wherein the authenticating the remote control and monitoring privileges further comprises:
authenticating, by the server, the hand held device based on at least one of: identity of the hand held device and a password;
when the hand held device is authenticated, comparing, by the server, at least one of: specific remote control function requested and specific monitoring function requested with valid remote control and monitoring functions for the hand held device; and
when the at least one of the specific remote control function and the specific monitoring function is one of the valid remote control and monitoring functions, indicating that the remote control and monitoring privileges are authentic.

13. The method of claim 11, wherein the determining remote control and monitoring privileges further comprises:
validating, by the server, the hand held device based on at least one of identity of the hand held device and a password.

14. The method of claim 11 further comprises:
encrypting, by the hand held device, the remote control/monitoring request to produce an encrypted request;
transmitting the encrypted request as the remote control/monitoring request; and
decrypting, by the server, the encrypted request to recapture the remote control/monitoring request.

15. The method of claim 11, wherein the remote control/monitoring request comprises at least one of:
requesting identification of a video program being viewed by the at one of the plurality of clients;
disabling the multimedia system;
disabling the at least one of the plurality of clients;
setting viewing restrictions for the at least one of the plurality of clients;
sending a message to the at least one of the plurality of clients, wherein the message includes at least one of: a video message, an audio message and a text message;
requesting viewing of images being captured by the at least one of the plurality of clients; and
disabling the at least one of the plurality of clients access to at least one particular channel.

16. The method of claim 15, wherein the providing the operational monitoring data further comprises at least one of:
providing identification of the video program being viewed by the at one of the plurality of clients;
providing feedback that the multimedia system has been disabled;
providing feedback that the at least one of the plurality of clients has been disabled;
providing feedback that viewing restrictions for the at least one of the plurality of clients have been set;
providing a response from the at least one of the plurality of clients to the message, wherein the response includes at least one of: a video response, an audio response and a text response;
providing the images being captured by the at least one of the plurality of clients; and
providing an indication that the at least one of the plurality of clients access to the at least one particular channel has been disabled.

17. An apparatus for remote control and monitoring of at least one of a plurality of clients of a multimedia system, the apparatus comprises:
processing module; and
memory operably coupled to the processing module, wherein the memory includes operational instructions that cause the processing module to:
transmit, as a hand held device of the multimedia system, a remote control/monitoring request regarding the at least one of the plurality of clients to a server of the multimedia system;
when a communication path is established between the hand held device and the server, determine, as the server, remote control and monitoring privileges of the hand held device, wherein the communication path is established by:
transmitting, as the hand held device, the remote control/monitoring request to the server via a local connection; and
when the server receives the remote control/monitoring request via the local connection, establishing the communication via the local connection;
when the server determines that the hand held device has at least a minimum level of remote control and monitoring privileges, process, as the server, the remote control/monitoring request with respect to the at least one of the plurality of clients to produce operational monitoring data; and provide, as the server, the operational monitoring data to the hand held device via the communication path;

determine, as the hand held device, whether operational monitoring data is received within a predetermined response time period;

when the operational monitoring data is not received within the predetermined response time period, transmit, as the hand held device, the remote control/monitoring request to the server via a wide area network, wherein transmitting the remote control/monitoring request via the wide area network includes:

determining an internet protocol (IP) address of the server; and formatting the remote control/monitoring request in accordance with a protocol of the wide area network to produce a formatted request, wherein the formatted request includes the IP address of the server as a destination address and an IP address of the hand held device as a source address; and when the server receives the remote control/monitoring request via the wide area network, establish the communication path via the wide area network.

18. The apparatus of claim 17, wherein the memory further comprises operational instructions that cause the processing module to determine the remote control and monitoring privileges by:

generating the remote control/monitoring request to include at least one of: an identity of the hand held device, a password associated with the hand held device, specific remote control function, specific monitoring function, and identity of the at least one of the plurality of clients;

authenticating, as the server, the hand held device based on at least one of the identity of the hand held device and the password;

when the hand held device is authenticated, comparing, as the server, at least one of the specific remote control function and the specific monitoring function with valid remote control and monitoring functions for the hand held device; and when the at least one of the specific remote control function and the specific monitoring function is one of the valid remote control and monitoring functions, indicating that the hand held device has at least the minimum level of remote control and monitoring privileges.

19. The apparatus of claim 17, wherein the memory further comprises operational instructions that cause the processing module to determine the remote control and monitoring privileges by:

generating the remote control/monitoring request to include at least one of: an identity of the hand held device, a password associated with the hand held device, specific remote control function, specific monitoring function, and identity of the at least one of the plurality of clients;

authenticating, as the server, the hand held device based on at least one of the identity of the hand held device and the password; and when the hand held device is authenticated, indicating that the hand held device has at least the minimum level of remote control and monitoring privileges.

20. The apparatus of claim 19, wherein the memory further comprises operational instructions that cause the processing module to:

encrypt, as the hand held device, the remote control/monitoring request to produce an encrypted request;

transmit the encrypted request as the remote control/monitoring request; and decrypt, as the server, the encrypted request to recapture the remote control/monitoring request.

21. The apparatus of claim 17, wherein the remote control/monitoring request comprises at least one of:

requesting identification of a video program being viewed by the at one of the plurality of clients;

disabling the multimedia system;

disabling the at least one of the plurality of clients;

setting viewing restrictions for the at least one of the plurality of clients;

sending a message to the at least one of the plurality of clients, wherein the message includes at least one of: a video message, an audio message and a text message;

requesting viewing of images being captured by the at least one of the plurality of clients; and disabling the at least one of the plurality of clients access to at least one particular channel.

22. The apparatus of claim 21, wherein the memory further comprises operational instructions that cause the processing module to provide the operational monitoring data further comprises at least one of:

providing identification of the video program being viewed by the at one of the plurality of clients;

providing feedback that the multimedia system has been disabled;

providing feedback that the at least one of the plurality of clients has been disabled;

providing feedback that viewing restrictions for the at least one of the plurality of clients have been set;

providing a response from the at least one of the plurality of clients to the message, wherein the response includes at least one of: a video response, an audio response and a text response;

providing the images being captured by the at least one of the plurality of clients; and providing an indication that the at least one of the plurality of clients access to the at least one particular channel has been disabled.

23. A hand held device comprises:

processing module; and memory operably coupled to the processing module, wherein the memory includes operational instructions that cause the processing module to:

receive an input for remote control/monitoring of at least one of a plurality of clients of a multimedia system;

initiate a remote control/monitoring algorithm in response to receiving the input;

execute the remote control/monitoring algorithm by:

generating a command message based on the input;

providing the command message to a server of the multimedia system by:

transmitting the command message to the server via a local connection;

determining whether the response is received within a predetermined response time period; and when the response is not received within the predetermined response time period, transmitting the command message to the server via a wide area network by:

determining an internet protocol (IP) address of the server; and formatting the command message in accordance with a protocol of the wide area network to produce a formatted message, wherein the formatted message includes the IP address of the server as a destination address and an IP address of the hand held device as a source address;
receiving a response from the server; and
displaying the response.

24. The hand held device of claim 23, wherein the memory further comprises operational instructions that cause the processing module to provide the command message by:
encrypting the command message to produce an encrypted message; and
transmitting the encrypted message to the server.

25. The hand held device of claim 23, wherein the command message comprises at least one of:
requesting identification of a video program being viewed by the at one of the plurality of clients;
disabling the multimedia system;
disabling the at least one of the plurality of clients;
setting viewing restrictions for the at least one of the plurality of clients;
sending a message to the at least one of the plurality of clients, wherein the message includes at least one of: a video message, an audio message and a text message;
requesting viewing of images being captured by the at least one of the plurality of clients; and
disabling the at least one of the plurality of clients access to at least one particular channel.

26. An apparatus for remote control and monitoring of a multimedia system, the apparatus comprises:
processing module; and
memory operably coupled to the processing module, wherein the memory includes operational instructions that cause the processing module to:
send, as a hand held device of the multimedia system, a remote control/monitoring request regarding at least one of a plurality of clients of the multimedia system to a server of the multimedia system via a wide area network by:
determining an internet protocol (IP) address of the server; and
formatting the remote control/monitoring request in accordance with a protocol of the wide area network to produce a formatted request, wherein the formatted request includes the IP address of the server as a destination address and an IP address of the hand held device as a source address;
authenticate, as the server, remote control and monitoring privileges of the hand held device;
when the server determines that the hand held device has at least a minimum level of remote control and monitoring privileges, process, as the server, the remote control/monitoring request with respect to the at least one of the plurality of clients to produce operational monitoring data; and
provide, as the server, the operational monitoring data to the hand held device via the wide area network.

27. The apparatus of claim 26, wherein the memory further comprises operational instructions that cause the processing module to authenticate the remote control and monitoring privileges by:
authenticating, as the server, the hand held device based on at least one of: identity of the hand held device and a password;
when the hand held device is authenticated, comparing, as the server, at least one of: specific remote control function requested and specific monitoring function requested with valid remote control and monitoring functions for the hand held device; and
when the at least one of the specific remote control function and the specific monitoring function is one of the valid remote control and monitoring functions, indicating that the remote control and monitoring privileges are authentic.

28. The apparatus of claim 26, wherein the memory further comprises operational instructions that cause the processing module to determine remote control and monitoring privileges by:
validating, as the server, the hand held device based on at least one of identity of the hand held device and a password.

29. The apparatus of claim 26, wherein the memory further comprises operational instructions that cause the processing module to:
encrypt, as the hand held device, the remote control/monitoring request to produce an encrypted request;
transmit the encrypted request as the remote control/monitoring request; and
decrypt, as the server, the encrypted request to recapture the remote control/monitoring request.

30. The apparatus of claim 26, wherein the remote control/monitoring request comprises at least one of:
requesting identification of a video program being viewed by the at one of the plurality of clients;
disabling the multimedia system;
disabling the at least one of the plurality of clients;
setting viewing restrictions for the at least one of the plurality of clients;
sending a message to the at least one of the plurality of clients, wherein the message includes at least one of: a video message, an audio message and a text message;
requesting viewing of images being captured by the at least one of the plurality of clients; and
disabling the at least one of the plurality of clients access to at least one particular channel.

31. The apparatus of claim 30, wherein the memory further comprises operational instructions that cause the processing module to provide the operational monitoring data by at least one of:
providing identification of the video program being viewed by the at one of the plurality of clients;
providing feedback that the multimedia system has been disabled;
providing feedback that the at least one of the plurality of clients has been disabled;
providing feedback that viewing restrictions for the at least one of the plurality of clients have been set;
providing a response from the at least one of the plurality of clients to the message, wherein the response includes at least one of: a video response, an audio response and a text response;
providing the images being captured by the at least one of the plurality of clients; and
providing an indication that the at least one of the plurality of clients access to the at least one particular channel has been disabled.

* * * * *